US006221002B1

(12) United States Patent
James

(10) Patent No.: US 6,221,002 B1
(45) Date of Patent: *Apr. 24, 2001

(54) METHOD TO REDUCE HEXAVALENT CHROMIUM IN SOILS, SEDIMENTS, INDUSTRIAL WASTES AND OTHER CONTAMINATED MATERIALS USING ASCORBIC ACID

(75) Inventor: Bruce R. James, Bowie, MD (US)

(73) Assignee: Chemical Land Holdings, Inc., Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/396,076

(22) Filed: Sep. 14, 1999

Related U.S. Application Data

(63) Continuation of application No. 08/883,243, filed on Jun. 26, 1997, now Pat. No. 5,951,457.

(51) Int. Cl.[7] .................................. A62D 3/08; B09C 1/08
(52) U.S. Cl. ........................ 588/256; 210/747; 210/757; 405/128; 588/236; 588/260
(58) Field of Search ..................................... 210/747, 757, 210/901; 405/128; 588/236, 249, 256, 260, 901

(56) References Cited

U.S. PATENT DOCUMENTS

| | | | |
|---|---|---|---|
| 3,784,669 | * 1/1974 | Elges, III et al. ............... | 210/720 X |
| 4,560,546 | * 12/1985 | Perrone et al. ...................... | 423/607 |
| 4,610,895 | * 9/1986 | Tubergen et al. ...................... | 427/98 |
| 5,285,000 | * 2/1994 | Schwitzgebel ...................... | 588/256 |
| 5,397,478 | * 3/1995 | Pal et al. .............................. | 588/256 |
| 5,928,406 | * 7/1999 | Salt et al. ......................... | 405/128 X |
| 5,951,457 | * 9/1999 | James .................................. | 588/256 |

* cited by examiner

*Primary Examiner*—George Suchfield
(74) *Attorney, Agent, or Firm*—Laurence Weinberger

(57) ABSTRACT

The concentration of potentially toxic hexavalent chromium, {Cr(VI)}, in chromium-bearing soils/materials existing in the form of soils, sludges, sediments, fill, industrial wastes, or other materials is decreased by applying and mixing a single reducing agent, ascorbic acid, to effect chemical reduction of Cr(VI) to a less toxic valence state. Ascorbic acid is added at ambient temperature in aqueous solution or slurry form and mixed with Cr(VI)-bearing soils/materials in amounts based on test results of representative samples of the material to be treated. Ascorbic acid may also be added in a dry form if sufficient moisture is present in the soils/materials to allow for dissolution of the ascorbic acid and reaction with the Cr(VI) in the material. The percentage reduction of the Cr(VI) concentration is greater and is achieved more rapidly than previously reported using other organic chemical reducing agents. The process, which does not require modification of the pH of the Cr(VI)-bearing material, can be applied in situ to Cr(VI)-bearing materials, including unsaturated and/or saturated soils in the same soil column, using mixing equipment appropriate for the depth of soil or material to be treated, and can be applied to materials that are stored in a container or have been excavated from the ground or other repository.

22 Claims, 5 Drawing Sheets

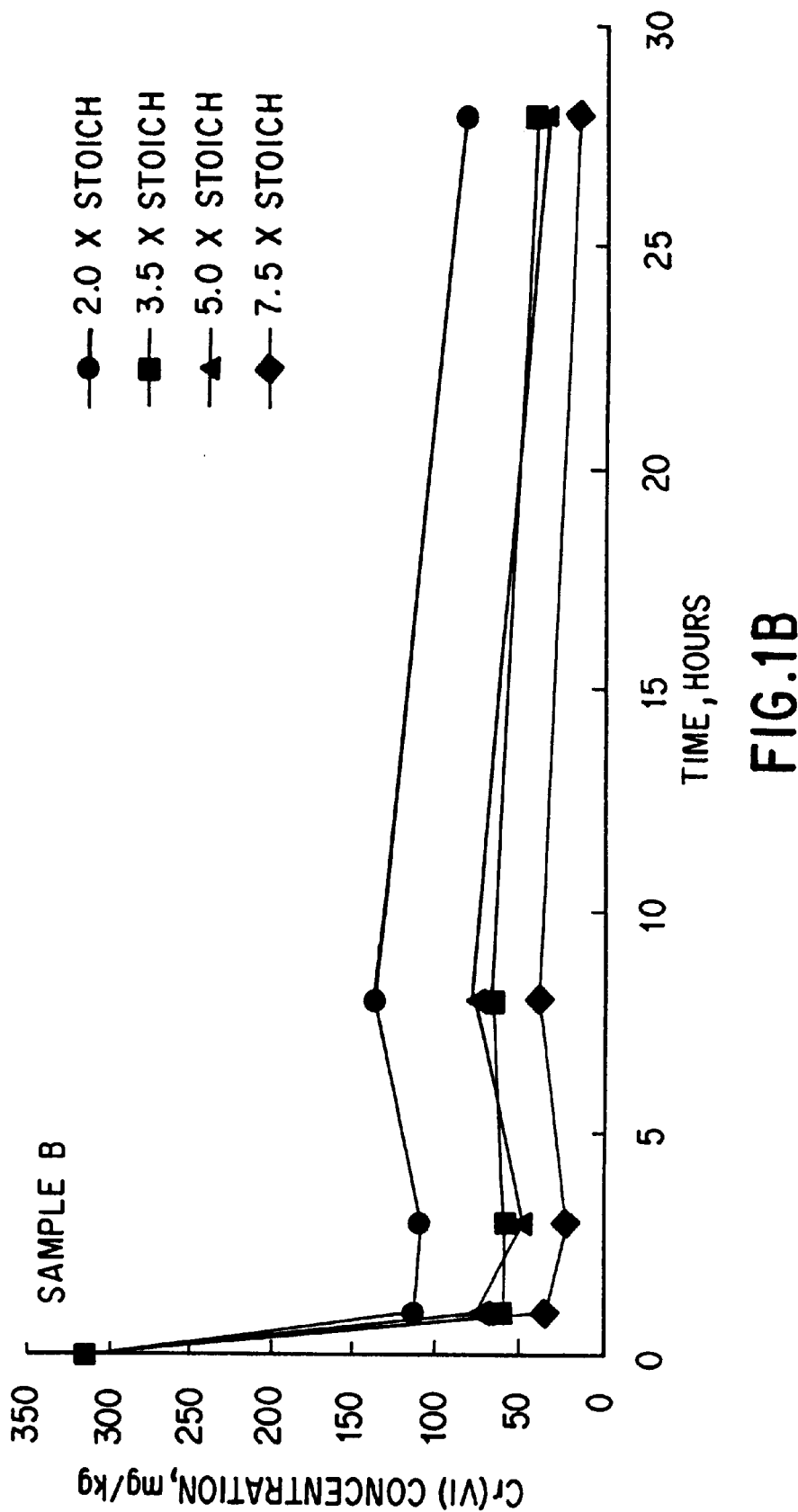

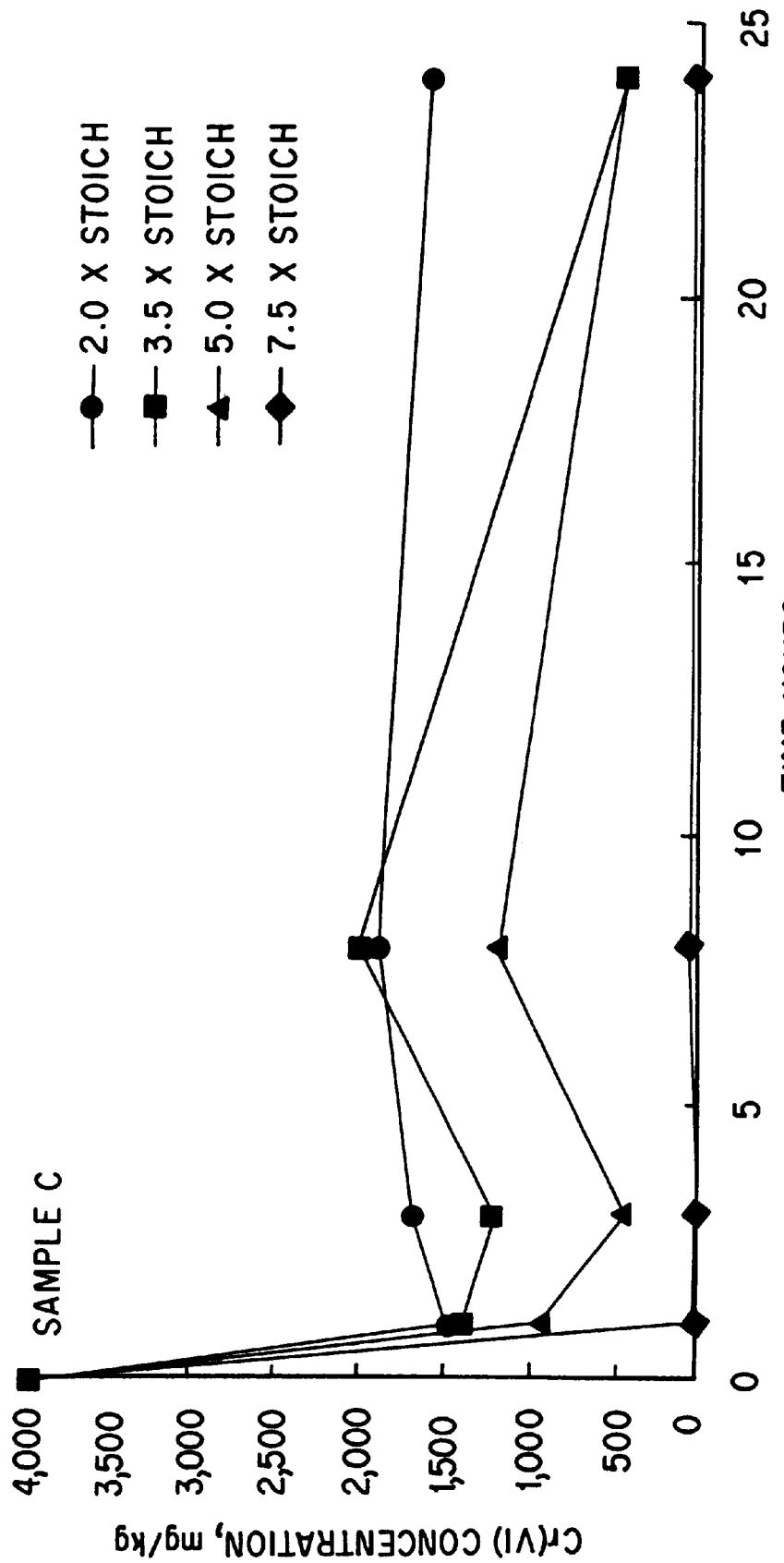

US 6,221,002 B1

METHOD TO REDUCE HEXAVALENT CHROMIUM IN SOILS, SEDIMENTS, INDUSTRIAL WASTES AND OTHER CONTAMINATED MATERIALS USING ASCORBIC ACID

This application is a continuation of U.S. application Ser. No. 08/883,243 filed Jun. 26, 1997, now U.S. Pat. No. 5,951,457.

BACKGROUND OF THE INVENTION

1. Field of the Invention

The present invention is a treatment process for hexavalent chromium {Cr(VI)}-bearing soils, sediments, industrial wastes, fill, or other materials that have become contaminated, have been released into the environment, or have been generated in the process of producing chromium compounds. Specifically, a process is disclosed which reduces the toxic hexavalent form of chromium, Cr(VI), to trivalent chromium, {Cr(III)}, through the addition of ascorbic acid (CAS: 5081-7; $C_6H_8O_6$)[1] to Cr(VI)-bearing soils/materials. The ascorbic acid is mixed with the Cr(VI)-bearing material in situ (in place) without the need to remove the soils/materials from the location in which they repose or can be applied ex situ (above the ground surface) to Cr(VI)-bearing material that has been excavated or otherwise removed from the ground or other repository. The process may be practiced at ambient temperature and atmospheric pressure. The reduction of Cr(VI) to Cr(III) is rapid and does not require the addition of other agents or prior alteration of the pH of the Cr(VI)-bearing soils/materials. The process is particularly applicable to soils exposed to Cr(VI) as a result of either 1) chromate chemical releases, or 2) mixing with Cr(VI)-bearing residue that was generated during the production of chromium compounds such as those derived from the processing of chromite ore, as described by Austin[2] and Westbrook,[3] or to chromite ore processing residue containing undesirably high levels of Cr(VI).

2. Regulatory and Factual Background

Pursuant to efforts to remediate hazardous waste sites across the United States, chromium, chromate, and/or Cr(VI) have been identified as contaminants of concern at a significant number of National Priority List (Superfund) sites under the Comprehensive Environmental Responsibility and Liability Compensation Act[4] as well as at many hundreds of other sites where chromium chemicals have been released into the environment. Cr(VI) is categorized as a human inhalation carcinogen,[5] and many forms of Cr(VI) are highly soluble and mobile in the environment. Inhalation of Cr(VI)-bearing airborne particulates is the most significant pathway of potential exposure to humans. The highly soluble and mobile characteristics of many chromate compounds are further concerns for Cr(VI)-bearing soils/materials as Cr(VI) contamination can spread significant distances from a source location via surface water runoff or groundwater migration. There is also concern about ingestion of water containing high total chromium concentrations which is reflected in the federal drinking water chromium concentration standard of 0.1 mg/L.

In contrast to Cr(VI), Cr(III) is not categorized as a human carcinogen and is even considered an essential trace nutrient for mammals. Although some soluble forms of Cr(III) have been shown to be toxic to certain aquatic species, soluble Cr(III) is rarely encountered in aquatic systems. Trivalent forms of chromium are most frequently encountered in insoluble forms in the environment.[6] Thus, Cr(III)-bearing soils/materials are considered a significantly lesser health concern than are Cr(VI)-bearing materials. Cr(VI) is most frequently the focus of remediation decision-making at sites where elevated levels of chromium have been identified in soils.

Under the Resource Conservation and Recovery Act (RCRA), the U.S. Environmental Protection Agency (USEPA) has established testing criteria for determining when a waste or soil containing chromium is considered to be a hazardous waste. When the USEPA standardized Toxicity Characteristic Leaching Procedure (TCLP) is applied to a material and the total chromium concentration present in the leachate is greater than 5 mg/L, the material is designated a "characteristic hazardous waste," subject to the RCRA treatment, storage, and disposal regulations.

Cr(VI) is not naturally found in most soil-water environments. Thus, essentially all Cr(VI) contamination encountered in soils, sediments, wastes, and other materials is the result of human activities.[7] Much of the Cr(VI) contamination is the result of spilled or discarded Cr(VI)-bearing materials, including such widely used chromate chemicals as $K_2Cr_2O_7$, $Na_2CrO_4$, and $CrO_3$.[8] Such Cr(VI) contamination can cause physical, chemical, and/or biological changes that alter the properties of the contaminated soils/materials, including pH, permeability, porosity, salinity, oxidation-reduction (redox) potential, and microbial population.

Another type of Cr(VI) contamination of soils is associated with chromite ore processing residue (COPR). This residue has unique physicalchemical properties (e.g. ranging in particle size from silt and sand grain-size spherical particles to agglomerated cement-like monoliths larger than baseballs), as described by James,[9,10] compared to most soils in their natural state. This residue material is produced by the roasting of chromite ore in a kiln under alkaline oxidizing conditions to commercially extract and produce various chromium compounds.[3,11] Because this extraction process is incomplete, the COPR contains residual soluble and insoluble Cr(VI).[12] The COPR is also quite alkaline, typically exhibiting a pH greater than 11, due to the use of lime (CaO) and soda ash ($Na_2CO_3$) in the roasting process.[3] Its color can vary based on the ore source and the materials used in the roasting process, although grayish-black and reddish-brown materials are typical.

For many decades of the twentieth century until the 1970s, COPR was used with other fill material to reclaim marshy areas near the chemical manufacturing facilities that produced it. The Cr(VI) and total chromium content of these COPR-bearing soils/materials vary widely based on many factors, including the source and characteristics of the chromite ore processed, the materials added while processing the ore, the actual processing conditions at the time the residue exited the process, the nature of the soils or fill material with which the COPR was mixed during its deposition, and the degree of weathering that has occurred since placement in the environment.

For soils that are highly-enriched with COPR, the total chromium concentration can exceed 30,000 mg/kg, with about 33% to 66% existing as Cr(VI). However, such elevated concentrations of total chromium and Cr(VI) in COPR-bearing soils are rarely encountered except at sites that were filled predominantly with COPR. Typical COPR-bearing soils contain total chromium concentrations from several hundred to 4,000 mg/kg with Cr(VI) concentrations representing about 1% to 8% of the total chromium. The other major cations in COPR-enriched soils are typically iron, aluminum, calcium, and magnesium, the concentrations of which also may vary widely according to the chromite ore source, processing conditions, and the mixture of COPR with other fill material.[13]

Compared to COPR-bearing soils, natural soils in the United States contain from 1 mg/kg to 2,000 mg/kg of total chromium with a mean of 54 mg/kg[14] and negligible concentrations of the chromium existing as Cr(VI). Also, in COPR-bearing soils that have been mixed with sediments or organic-rich soils, the Cr(VI) concentrations may approach non-detectable levels ($\leq 5$ mg/kg) due to the reducing conditions of the soil matrix,[12,15] even though the total chromium concentration may be greater than 10,000 mg/kg.

DESCRIPTION OF THE RELATED ART

Physical removal and/or isolation (e.g. solidification/stabilization, encapsulation, slurry walls, containment caps, etc.) are conventional practices that have been used to address Cr(VI) soils/materials contamination.[16] In U.S. Pat. No. 4,504,321, Kapland and Robinson taught that combining chromium ore waste with certain mud or dredged sludge and adding 5–30% finely ground blast furnace slag stabilized the mixture to a hardened state after curing. In the process described in U.S. Pat. No. 3,937,785, Gancy and Wamser taught that decreasing the particle size of COPR by grinding, so that at least 20% by weight passes through a 200 mesh screen, can decrease the bleeding of soluble Cr(VI) from COPR-bearing soils upon their contact with water at the disposal site. Another physical treatment methodology for remediating sites with Cr(VI)-bearing soils has involved either excavating and washing the soils or flushing them in place.[16] However, this method typically exhibits limited effectiveness, except in soils containing readily reducible Cr(VI) compounds. One problem with a great deal of the prior art is that physical removal, relocation, or isolation techniques do not usually change the Cr(VI) to a less hazardous valence state. Using these techniques, the Cr(VI)-contaminated materials are: 1) merely transferred to another repository; 2) captured in an aqueous stream that must then be treated to reduce the Cr(VI) and remove it from the water; or 3) physically contained in the site location at which they exist where they remain a long-term concern for potential uncontrolled Cr(VI) release into the environment.

Cr(VI) reduction to Cr(III) represents a way to decrease the toxicity and mobility of the Cr(VI) present in the soils/s materials without having to extract or change the total chromium content of the materials. Chemical reduction processes that reduce the Cr(VI) in aqueous or solid materials to Cr(III) have been described in the prior art, sometimes combining solidification/stabilization processes with Cr(VI) reduction to achieve greater hazard abatement of the treated material. Pal and Yost described a process for Cr(VI) reduction, stabilization, and fixation of chromium in contaminated materials in U.S. Pat. No. 5,397,478. The soils or wastewaters containing Cr(VI) are first treated with a reducing agent such as sodium dithionite, sodium hydrosulfite, ferrous sulfate, sulfur dioxide, or one of several forms of sodium sulfite, then treated by lime addition to stabilize the reduced chromium, and finally treated by phosphate addition to complete the fixation process.

Chemical processes taught in the prior art have cited a variety of reducing and treatment agents for Cr(VI), including use of the following: 1) reducing sugars such as sucrose, glucose and maltose (Elges et al., U.S. Pat. No. 3,784,669); 2) water insoluble lead compounds (e.g. lead oxide, lead carbonate, and lead hydroxide) to precipitate lead chromate from wastewaters (Nieuwenhuls, U.S. Pat. No. 3,791,520); 3) barium carbonate for direct precipitation and recovery of chromium from wastewater containing chromic acid and/or metallic chromate salts in an aqueous medium acidified with glacial acetic acid (Feltz and Cunningham, U.S. Pat. No. 3,969,246); 4) non-powdery elemental iron to reduce Cr(VI) to Cr(III) by treating acidified industrial wastewaters in a gravity flow system (Roy, U.S. Pat. No. 4,108,770); 5) hydrogen peroxide and oxalic, malic or maleic acid with polyvinyl alcohol and lime application to precipitate $Cr(OH)_2$ from Cr(VI)-bearing wastewaters (Hawxhurst and Slobbe, U.S. Pat. No. 4,321,149); and 6) alkali metal dithionite to reduce the Cr(VI) to Cr(III) in waste material and subsequently separate the coprecipitated material from the waste (Pilznienski, U.S. Pat. No. 5,200,088).

Another chemical method described by Ladd and Miller in U.S. Pat. No. 4,798,708 is a complex process that involves the recovery of chromium from chromium-bearing material comprising the use of one or more strategic or other metals (e.g. cobalt, nickel, molybdenum, tungsten, aluminum, iron, and tin) by atomizing the chromium-bearing material to a flowable powder and heating it in an alkaline oxidizing environment, followed by formation of a water slurry and pH adjustment to about 9.6 to capture insoluble metals (i.e. cobalt, nickel, iron, and aluminum), followed by pH adjustment to less than 2 and addition of methyl alcohol in a sufficient amount to reduce the Cr(VI) to Cr(III). Activated carbon adsorption is then applied to separate the tungsten and molybdenum from the suspension, followed by pH adjustment to about 5.0 to 8.5 with base to form a precipitate, followed by separation of essentially all the chromium from the resulting spent liquor.

Another method taught by Schwitzgebel in U.S. Pat. No. 5,285,000 is a process in which metal-contaminated soil is treated with ferrous iron to reduce Cr(VI) to Cr(III), followed by the addition of sodium silicate to form an impermeable gel that decreases the permeability of the treated soil matrix. Perrone et al. in U.S. Pat. Nos. 4,401,573 and 4,560,546 taught that treating chromium-containing wastewaters using acetic acid or alkaline acetates and alkaline hydroxides at 40–100° C. and pH values greater than 6.5 produces chromium hydroxide that quickly filters for the recovery of the chromium. Chemical treatment by iron particle addition and mechanical agitation to reduce the Cr(VI), followed by pH adjustment and separation of the insoluble precipitates from wastewater has been addressed in the prior art taught by Thornton (U.S. Pat. No. 5,380,441).

In addition to chemical reduction methods, bioremediation processes have been developed to reduce Cr(VI) to Cr(III). To address Cr(VI)-contaminated waters in the ground, Lupton et al. in U.S. Pat. No. 5,062,956 describe a treatment process that uses sulfate-reducing anaerobic bacteria and an alkaline additive to reduce Cr(VI) to Cr(III) and immobilize Cr(III) as an insoluble hydroxide. Lupton et al. in U.S. Pat. No. 5,155,042 subsequently described another bioremediation process for treating Cr(VI)-contaminated solid residues by first treating them with acid to separate the Cr(VI) from the solids and to produce an aqueous solution with a pH in the range of 6.5 to 9.5, followed by the addition of sulfate-reducing anaerobic bacteria and nutrients to reduce the Cr(VI) to Cr(III). A variation of the approach was described by Higgins in U.S. Pat. No. 5,562,588 for in situ mixing of a mineral acid or base to adjust the pH of Cr(VI)-bearing solids to the 6.5 to 9.5 range, followed by the mixing of organic matter, such as animal manure or peat, to provide bacteria and nutrients for reducing Cr(VI) to Cr(III) without having to remove the soils from the ground. Higgins taught that the treatment materials should be sufficiently mixed with the Cr(VI)-bearing soil in place using a hollow-shaft auger or other suitable mechanical mixer, and that ferrous sulfate may be added to increase the rate of Cr(VI) reduction.

Finally, a hybrid chemical reduction and in situ mechanical mixing process described by Stanforth in U.S. Pat. No. 5,202,031 treats solid waste containing arsenic, cadmium, chromium, and/or copper by first mixing the waste with a phosphate or carbonate agent or ferrous sulfate, and possibly a pH control agent, followed either by spreading the material on top of the soil and mixing with one or more mechanical devices or by using chemical injection and mixing equipment such as nozzles or wells, infiltration galleries, or a hollow-shaft auger to effect in-place mechanical mixing.

For one or more of the following reasons, most of the aforementioned patented processes are not presently being used for treating Cr(VI)-containing soils, sediments, fill, or wastes or remediation sites contaminated with Cr(VI): 1) the complexity of the process, 2) the transport distance and cost of materials needed in the process, 3) the difficulty of managing residuals produced by the process, 4) poor performance effectiveness in reducing Cr(VI) to Cr(III), 5) complications associated with shallow ground water at a site, and/or 6) the high cost of process application. Additionally, most prior art methods are limited in the range of materials which they can treat at the same time, in particular Cr(VI) contamination that exists in both water unsaturated and water saturated soils in the same soil column of a site.

SUMMARY OF THE INVENTION

The present invention is based on a different approach to in situ or ex situ Cr(VI) concentration {[Cr(VI)]} reduction than that described in prior art. This invention consists of a process in which a single organic compound, ascorbic acid, is added and mixed in situ or ex situ with Cr(VI)-bearing soils, sediments, sludges, fill, wastes, or other materials. In the preferred embodiment of this invention, the materials do not have to be removed from the ground or other repository in which they repose. This significantly reduces the cost and effort required to clean up a contaminated site. Alternatively, the process may be applied to Cr(VI)-contaminated materials as they are generated or to Cr(VI)-contaminated materials that have been excavated from the ground or other repository (ex situ). Ascorbic acid is a nonhazardous substance which, when properly handled in accordance with manufacturers' safety precautions, can be used over a wide range of concentrations without concern for human health or environmental detriment. To practice the present invention, ascorbic acid may be added to the soils/materials as an aqueous solution or supersaturated slurry. Alternatively, it can be applied in a dry form if the soil or other Cr(VI)-contaminated material has adequate moisture to allow for sufficient mixing and dissolution of the ascorbic acid.

To practice the process, the [Cr(VI)] in the material is first determined, along with such ancillary parameters as pH and $E_h$ (redox potential) that help to characterize the oxidation-reduction status of the soils/materials to be treated. In the process an amount of ascorbic acid in excess of the theoretical stoichiometric amount required for the determined Cr(VI) concentration is added. An excess is used to provide an amount of ascorbic acid that sufficiently reduces both bound and unbound forms of Cr(VI) in the soils/materials. Multiple samples are treated with different amounts of ascorbic acid and analyzed to determine the quantity of ascorbic acid needed (in excess of the theoretical stoichiometric amount) to achieve the desired reduction of [Cr(VI)]. The treated material is typically analyzed for [Cr(VI)], pH, and $E_h$. Based upon these data, the appropriate amount of ascorbic acid can be selected for addition and mixing in situ or ex situ with the soils/materials to be treated either in a single step or a multiple step process to reduce Cr(VI) to Cr(III) to achieve the desired treatment objective.

Ascorbic acid has been discovered to be substantially more effective in reducing Cr(VI) to Cr(III) in Cr(VI)-bearing soils compared to other common organic acids, such as acetic acid and citric acid, and many other organic compounds considered to be potential reducing agents. The reduction of the Cr(VI) concentration to Cr(III) in Cr(VI)-bearing soils by ascorbic acid was also surprisingly found to be significantly faster than has been reported for other potential organic reducing agents and compared to the bioremediation processes described in the prior art. After addition of the ascorbic acid, significant [Cr(VI)] reduction was achieved in hours, compared to the days needed for other organic reducing agents and the many months typically required for bioremediation processes to achieve similar results.

In laboratory tests, it was also discovered that when ascorbic acid or a mineral acid were each applied to highly alkaline COPR-bearing soils, minimal amounts of gas were generated by the ascorbic acid compared to significant quantities of gas and heat generated by the mineral acid. This finding is significant with regard to field applications where the formation of excess gas could 1) limit the quantity of additive(s) that can be mixed in situ and 2) inhibit the effectiveness of [Cr(VI)] reduction described in the prior art.

For locations where Cr(VI)-bearing soils/materials exists in both the unsaturated zone, above the water table, and in the saturated zone, below the water table, the process of the present invention is capable of treating the Cr(VI) in both soil layers and the associated ground water, if any, at the same time. Mechanical injection and mixing equipment that can penetrate more than 50 feet into the subsurface and provide for concurrent ascorbic acid delivery and in situ mixing within the Cr(VI)-bearing soil column in a single step is well known to those practiced in the art.

The process of this invention can also be used to treat Cr(VI)-bearing surface soils down to a few feet below the ground surface, where [Cr(VI)] reduction is necessary or intended only for these surface soils. The ascorbic acid may be added as an aqueous slurry or solution or in dry form and mixed in situ in a single step or in multiple applications. Depending on the soil moisture content, it may be necessary to add water to the soils/materials to allow for sufficient mixing to effect solubilization of the ascorbic acid with the Cr(VI)-bearing material.

The process of this invention can also be used to treat soils/materials that have been stored in containers or earthen structures or removed (e.g. excavated) from the ground or other repository. The use of such conventional equipment as excavators, conveyance systems, chemical feed systems, pug mills, front end loaders, and transport vehicles to apply this ascorbic acid treatment process is considered well known to those practiced in the art of treating contaminated soils/materials.

The process of this invention usually does not require adjustment of the pH of the Cr(VI)-bearing soils/materials, nor does it require the addition of other organic matter and nutrients, bacteria or other microorganisms, and subsequent maintenance of suitable pH conditions for their propagation. Unlike some prior art processes, which require the addition of heat, the process of this invention may be practiced on Cr(VI)-bearing soils/s materials at ambient temperatures and pressures. The collective features of this invention provide for more rapid, thorough, and economical treatment of Cr(VI)-bearing soils/materials compared to processes taught in the prior art.

A first object of this invention is to provide a method for reducing potentially toxic forms of chromium existing in the environment, particularly hexavalent chromium, to less toxic forms, principally trivalent chromium, by reduction with ascorbic acid.

A further object of the invention is to provide a method for hexavalent chromium reduction using ascorbic acid which may be applied in situ to chromium-contaminated soils/materials without the necessity of removal of the soils/materials from their place of repose.

A further object of this invention is to provide a method for the treatment of hexavalent chromium-contaminated waste in all forms either in situ or ex situ with ascorbic acid to reduce potentially toxic hexavalent chromium to less hazardous trivalent chromium.

An additional object of this invention is to provide a method for analyzing chromium-contaminated soils/materials to determine the proper amount of ascorbic acid to use to achieve a desired level of hexavalent chromium reduction.

Yet a further object of this invention is to provide a method for treating chromium-contaminated soils/materials which reside principally in the near surface environment.

A further object of this invention is to provide a method that achieves the rapid reduction of hexavalent chromium in a single-step process using ascorbic acid.

An additional object of this invention is to provide a method for measuring and evaluating the effectiveness of a method for the rapid reduction of hexavalent chromium to trivalent chromium using ascorbic acid.

A further object of this invention is to provide a method using ascorbic acid for reducing hexavalent chromium to trivalent chromium that maintains the treated material in a reduced valence state.

An additional object of this invention is to provide a process of treatment for hexavalent chromium-contaminated materials that reduces the hexavalent chromium to trivalent chromium which then exists in a stable reduced valence state.

BRIEF DESCRIPTION OF THE DRAWINGS

FIGS. 1A through 1E show Cr(VI) concentrations versus time after ascorbic acid treatment for samples A through E at different dosages.

DETAILED DESCRIPTION OF A PREFERRED EMBODIMENT

Figure 1A:
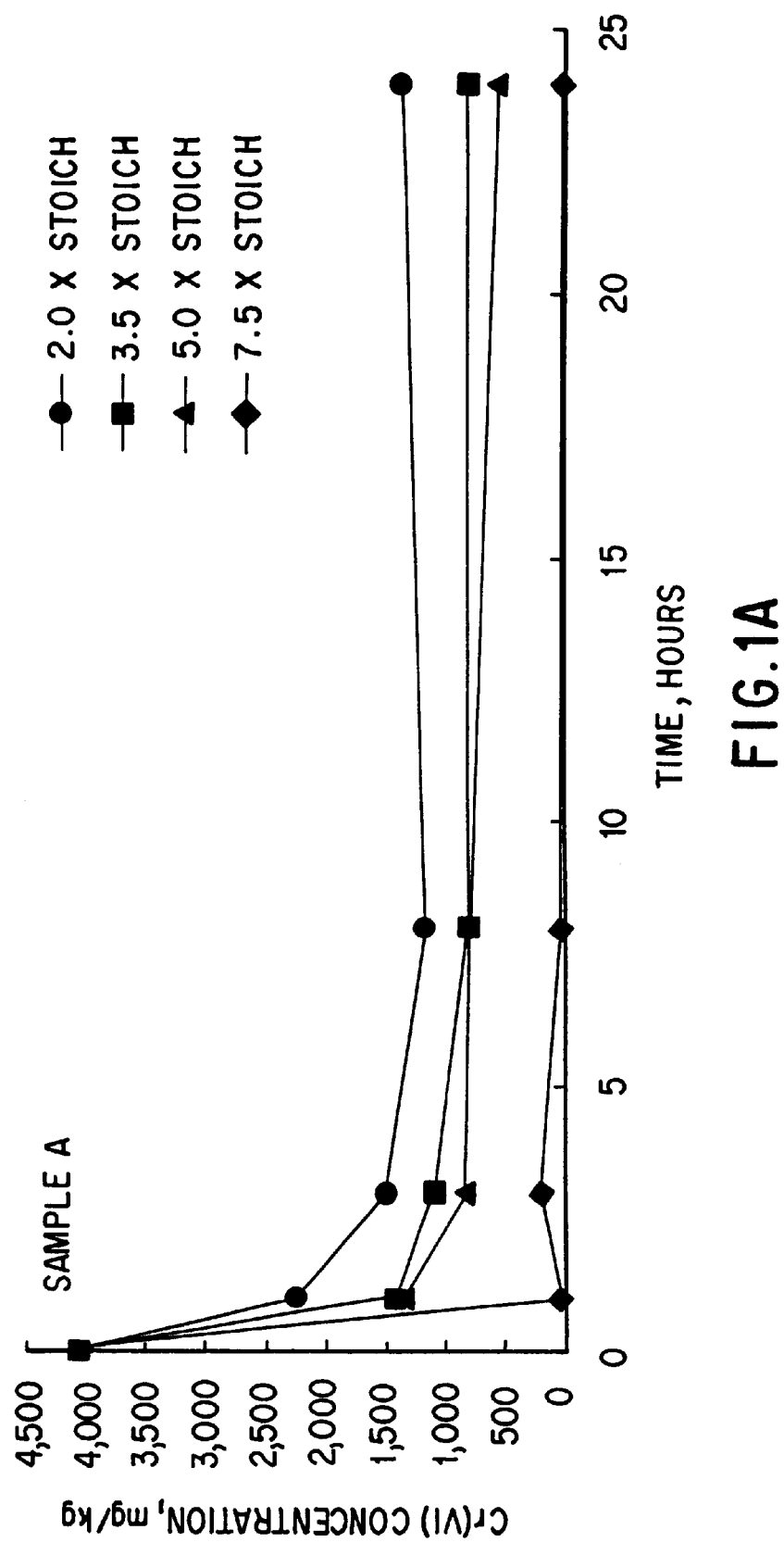

The present invention is a process in which ascorbic acid is added to and mixed sufficiently with Cr(VI)-bearing soils, sediments, sludges, wastes, fill, or other materials (with or without removing the materials from the ground or other resting place) to chemically reduce the Cr(VI) to Cr(III). By using a relatively safe organic acid, the hazards associated with some of the additives used in the prior art (e.g. hydrogen peroxide, sulfuric acid, ferrous sulfate, lime, hydrazine) are avoided. The single additive employed with this process, ascorbic acid, when used in accordance with manufacturers' safe handling instructions, poses no hazard or environmental concern to remediation workers, nearby residents, and/or other nearby workers or the environment, because ascorbic acid has essentially no potential toxicity to humans. In fact, ascorbic acid is important to human health in preventing scurvy, and is used as a beneficial food supplement.

It is believed that the reduction reactions involved in the process may be described by the following chemical equation in which ascorbic acid is consumed and dehydroascorbate is formed at the same time as the chromate ion is reduced to the trivalent state in the form of chromium hydroxide, an insoluble compound that is not prone to re-oxidation.

$$CrO_4^{2-}+2H^++1.5\ C_6H_8O_6 \rightarrow Cr(OH)_3+1.5C_6H_6O_6+H_2O \quad (Eq.1)$$

Although this relationship is believed to be representative and a principal mechanism for the reduction of Cr(VI) to Cr(III) by ascorbic acid, it is possible that other chemical reactions occur simultaneously and potentially at different reaction rates than this reaction. In fact, as will be seen below, the fact that amounts in excess of the above-defined stoichiometric amounts are required in real world systems, suggests that other reactions, and perhaps competing reactions, may be involved. Nonetheless, based upon this equation as a benchmark, the stoichiometric amount of ascorbic acid required to reduce 1 g of Cr(VI) to Cr(III) in the form of insoluble chromium hydroxide is 5.1 g (see Eq. 1).

The first step in applying the process of this invention is to measure the Cr(VI) concentration of representative samples of the soils/materials to be treated. This can be accomplished using the standard alkaline extraction and analysis procedure described by Vitale et al.[12] It is also important to measure such ancillary parameters as the total chromium concentration, pH, and $E_h$ as discussed by James et al.[15] to assist in confirming the changed redox condition (increased reducing condition) of the treated material compared to the untreated material.

Based upon the determined [Cr(VI)], the stoichiometric amount of ascorbic acid according to Equation 1 required to reduce the [Cr(VI)] can be calculated. In addition, several multiples of the stoichiometric amount, typically in the range of 2× to 9×, are calculated. The purpose of determining the stoichiometric amount and related multiples is to provide a range of dosages of ascorbic acid with which to test the Cr(VI)-contaminated materials. As will be seen in the examples below, the effect of different dosages varies with the sample. This is to be expected for several reasons: 1) materials from which the samples are taken are not homogeneous even at the same site; 2) the samples are complex organic and inorganic mixtures of Cr(VI)-contaminated materials; and 3) the nature and source of the Cr(VI)-contaminated materials vary widely. For example, as discussed earlier, chromite processing yields COPR with varying particle size, alkalinity, and physical as well as chemical composition. Typically, stoichiometric multiples of 2× to 7.5× have been found useful and sufficient to cover the range of materials tested. Clearly, however, one skilled in the art who practices this invention will recognize those circumstances when a greater range of stoichiometric multiples should be employed.

The stoichiometric and multiple dosages are then added to and mixed sufficiently with representative untreated samples of the Cr(VI)-bearing material. A control sample (no ascorbic acid) is also included for baseline measurement. Three principal measurements are performed on the treated materials as a function of time after mixing, Cr(VI) concentration, $E_h$ and pH. These three measurements can be used to determine 1) whether sufficient [Cr(VI)] reduction has been achieved with a particular material and 2) whether the [Cr(III)] is likely to remain reduced over time.

In the chemical reduction process of this invention, based upon observed results, the following must occur. The ascorbic acid in solution penetrates and disperses into the pores and between the soil particles to reduce the Cr(VI) to Cr(III). When the ascorbic acid is provided in a dose sufficiently in excess of the theoretical amount, the desire Cr(VI) reduction is achieved. The desired level of [Cr(VI)] reduction depends on a number of factors including, but not limited to, the location of the contaminated materials, the likely human exposure, and presently applicable environmental regulations and cleanup criteria. One such reduction criterion is the soil screening guideline established by USEPA in 1996 for use at Superfund sites for remediation of Cr(VI)-contaminated soils in residential locations. The guideline established is a maximum soil concentration of 270 mg Cr(VI)/kg based on an inhalation exposure pathway.[17]

Based on the treatability test results of representative samples described above, a dosage amount (stoichiometric multiple) is chosen which will yield the desired [Cr(VI)] reduction. Ascorbic acid is applied in situ or ex situ as an aqueous solution or supersaturated slurry with sufficient chemical and mechanical mixing to cause the reduction of Cr(VI) to Cr(III) in the soils/materials. Depending on the concentration reduction objective(s) for a particular contaminated site and the response of the soils/materials to ascorbic acid treatment, the appropriate stoichiometric multiple may be selected based on the test results to reduce the [Cr(VI)] over a short or long time interval. Larger multiples of ascorbic acid typically reduce the Cr(VI) to Cr(III) more rapidly than smaller multiples, but at a higher cost for the greater amount of ascorbic acid required. If a lower multiple can achieve the desired [Cr(VI)] reduction over a longer and acceptable time interval, it may be economically advantageous to select the lower multiple. Such a selection should also consider the other cost elements of delivering and mixing the ascorbic acid with the soils/materials to be treated.

The ascorbic acid solution or slurry can be added and mixed simultaneously with the soils/materials or added first and mixed thereafter. The method and duration of mixing depend primarily on the moisture content, viscosity, cohesiveness and other properties of the soils/materials that affect the ability of the selected equipment to sufficiently mix the ascorbic acid with the Cr(VI)-bearing material. As noted above, mixing methods are well known to those skilled in the remediation art and include, but are not limited to, deep-soil mixing devices or agricultural implements that are used to mix soils relatively close to the surface. Samples of treated soils may be collected and analyzed to determine if the treatment objectives have been achieved.

The process of this invention can also be practiced using a dry form of ascorbic acid if there is either sufficient naturally-occurring moisture in the soil, atmospheric precipitation is frequent and sufficient, or if moisture can be applied separately to the soils to help dissolve the ascorbic acid and distribute it into the pores within the soils/materials matrix. When used dry (e.g. powder), ascorbic acid may be used to treat surface and shallow soils/materials (e.g. down to a few feet below the ground surface) in one or more applications, using the treatability results described above to assist in the dosage selection. The ascorbic acid is mixed into the soils/materials using one or more suitable shallow soil mixing devices well known in the art, such as harrows, disks, plows, tillers, or other such implements the are typically used in agricultural soils preparation.

The soils/materials to be treated should be mixed during or immediately after the addition of the ascorbic acid to effect the maximum benefit for field application. Use of a hollow stem auger with mixing blades allows for the injection of ascorbic acid in an aqueous solution or slurry directly into the soils/materials at the same time that the soils/materials are being mixed. This is an effective method for treating soils/materials that are located more than 2 to 3 feet below grade, and can be used to treat Cr(VI)-bearing soils, sludges, sediment, and the like to depths of 50 feet or more below the surface as long as obstructions, bedrock, or other conditions that limit the mixing capability of the selected device are not encountered.

If it is advantageous from a logistical or technical or other reason to remove the Cr(VI)-bearing soils/materials from the ground or earthen repository or other storage location for ascorbic acid treatment, the use of conventional equipment (e.g. excavators, conveyors, chemical storage/feed systems, mixing vessels, and earth moving vehicles) to apply and mix the ascorbic acid is considered well within the skills of those practiced in the art of contaminated soils/materials treatment.

Another distinct advantage of the process of this invention is that it can be practiced at ambient temperatures typically encountered in Cr(VI)-bearing soils. As soil temperatures generally range from somewhat below freezing (0° C. or 32° F.) to more than 30° C. (86° F.) near the ground surface and are relatively close to about 13° C. (55° F.) below the frost line, the rate of [Cr(VI)] reduction exhibited in laboratory tests at standard temperature and pressure will differ somewhat under field conditions. For every 10° C. (18° F.) decrease in soil temperature, the reaction rate is expected to decrease by about half, with the reverse expected for increased soil temperature. This means, for example, that the amount of [Cr(VI)] reduction achieved within a particular time interval in the laboratory may take longer under field conditions below the frost line. If frozen soils/materials are to be treated, for example, additional ascorbic acid mixing and/or heat may need to be applied to achieve the desired reduction in [Cr(VI)] within an acceptable time period. Such modifications to the process of this invention are considered within the skill level of those familiar with treatment/remediation art. Under such circumstances, suitable preliminary tests in line with the present teaching would be appropriate to determine suitable conditions for application of the process.

It has been discovered that ascorbic acid has superior reducing characteristics (with respect to its effectiveness and rate of [Cr(VI)] reduction in Cr(VI)-bearing soils/materials ) compared to more than a dozen other organic compounds with various functional groups, including acetic acid, citric acid, lactic acid, oxalic acid, mandelic acid, salicyclic acid, and substituted phenols. From its molecular structure and common uses, one might expect ascorbic acid to function as a reducing agent. However, the exceptional rapidity and greater effectiveness with which it reduces Cr(VI) to Cr(III)

in Cr(VI)-bearing soils/materials compared to other organic substances was unexpected prior to the discovery of this invention. Results from comparative laboratory testing of several different Cr(VI)-bearing soils containing widely varying Cr(VI) concentrations from locations with different site characteristics show that ascorbic acid yields much greater percentage reductions of the Cr(VI) concentration than either acetic acid or citric acid. Acetic acid and citric acid effected less than 55% reduction in the Cr(VI) concentration compared to about 88 to 99.9% using ascorbic acid at similar treatment dosages. In addition, these results were achieved in only hours using ascorbic acid. This is also exceedingly rapid compared to the many months required for bioremediation processes described in the prior art to achieve comparable [Cr(VI)] reduction.

The rate of [Cr(VI)] reduction by ascorbic acid was also unexpectedly found to be much greater than the rates reported by Deng and Stone[18] using numerous organic compounds to treat for [Cr(VI)] reduction in aqueous solutions containing approximately 1 mg/l of Cr(VI) in the presence and absence of oxide surfaces ($TiO_2$). Deng and Stone's research focused on 16 low molecular weight organic compounds (not including ascorbic acid) in six functional groups (α-hydroxycarboxylic acids, their esters, α-keto acids, oxalic acid, benzaldehyde, and phenolic compounds), none of which reduced significant amounts of Cr(VI) in the absence of oxide surfaces. In the presence of oxide surfaces, Deng and Stone found that [Cr(VI)] reduction typically ranged from 15 to 80 percent over periods of about 5.5 to 8 days. Only two of the compounds, 4-methoxyphenol and mandelic acid, achieved greater than 80% [Cr(VI)] reduction (97 and 94% over about 35 and 54 hours, respectively). Thus, nothing in the prior art remotely suggested that ascorbic acid would produce such dramatic results with Cr(VI)-bearing soil and waste materials.

Methods and Materials
Experimental Protocol

Laboratory testing was conducted to determine the effectiveness of ascorbic acid reduction of Cr(VI) to Cr(III) in a variety of Cr(VI)-bearing soils. Two other common organic acids, acetic and citric, were tested for comparison. The testing entailed the use of 50 g samples (aliquots) of different COPR-bearing soils containing moderate to high concentrations of Cr(VI). To 50 g aliquots taken from each sample location, different amounts of ascorbic acid (0.55 g/ml in deionized water) were added and vigorously mixed manually for about 30 seconds at room temperature. Fewer acid levels and sampling intervals were used, however, for the acetic acid or citric acid trials than with the ascorbic acid, although all the aliquots were mixed in a similar manner. After initial mixing and for the remainder of the test, the samples were exposed to ambient air at 25° C., but were not mixed again. Sufficient quantities of control (untreated) and treated samples were prepared to allow for collection and analysis of individual aliquots at various time intervals up to at least 28 days for each sample source. At each time interval, $E_h$ and pH were measured using calibrated measuring devices, and total Cr(VI) was measured using SW-846 Methods 3060A/7196A.[19,20] The $E_h$ data relate to the redox status of a sample such that decreased $E_h$ values in an ascorbic acid-treated sample compared to the untreated sample indicate that conditions in the treated sample are more conducive to Cr(VI) reduction than in the untreated sample. Quality control samples, including duplicates and laboratory blanks, were also included in the protocol to demonstrate that the test results met essential requirements for data quality acceptance.

The following examples illustrate the applicability of the process of this invention in COPR-bearing soils containing a wide range of Cr(VI) concentrations. Each of the samples was collected from a different location at sites identified as having Cr(VI) contamination. COPR-bearing soils were known or suspected to have been deposited at each of the locations along with other unidentified fill materials of unknown origin. There were no other common characteristics among the five samples discussed below. Based on prior sampling and testing experience with the type of non-homogeneous Cr(VI)-contaminated material used for testing the process of this invention, multiple control (no ascorbic acid added) aliquots were collected and analyzed for [Cr(VI)] at the same time intervals as the ascorbic acid-treated samples were collected for analysis. Since, as expected, the samples were not homogeneous, and yielded varying Cr(VI) concentrations for the different aliquots, the arithmetic mean of the multiple control samples was used to calculate the [Cr(VI)] reduction percentage at each stoichiometric multiple, although only the percentages of [Cr(VI)] reduction of the 7.5× stoichiometric multiples at different time intervals are shown in the tables below.

EXAMPLE 1

The above-described protocol was applied to a COPR-bearing soil (designated "Sample A") containing an average over the test period of 4,060 mg Cr(VI)/kg. The untreated (control) sample exhibited an initial pH of 12.1 and an initial redox potential ($E_h$) of 533 mV. Table 1 summarizes the results of the testing.

TABLE 1

Ascorbic Acid Treatment of Cr(VI)-Bearing Soils
Sample A

| | | | | | | | | | | | | | | |
|---|---|---|---|---|---|---|---|---|---|---|---|---|---|---|
| | Stoichiometric Multiple | | | | | | | | | | | | | |
| Time | 0 | 2.0 | 3.5 | 5.0 | 7.5 | % Cr(VI) Reduced | 0.0 | 2.0 | 3.5 | 7.5 | 0.0 | 2.0 | 3.5 | 7.5 |
| Hr | Cr(VI), mg/kg | | | | | From Avg | pH Units | | | | Eh, mV | | | |
| 0 | | | | | | | 12.1 | | | | 533 | | | |
| 1 | 3,420 | 2,240 | 1,420 | 1,380 | 42 | 99.0 | | 10.6 | 9.3 | 8.7 | | 149 | 181 | 195 |
| 3 | 3,150 | 1,490 | 1,090 | 837 | 185 | 95.4 | | 10.6 | 9.2 | 8.7 | | 151 | 168 | 182 |
| 8 | 5,280 | 1,180 | 807 | 795 | 45 | 98.9 | | 10.4 | 9.3 | 9.0 | | 124 | 145 | 151 |

TABLE 1-continued

Ascorbic Acid Treatment of Cr(VI)-Bearing Soils
Sample A

| | Stoichiometric Multiple | | | | | | | | | | | | |
|---|---|---|---|---|---|---|---|---|---|---|---|---|---|
| Time | 0 | 2.0 | 3.5 | 5.0 | 7.5 | % Cr(VI) Reduced | 0.0 | 2.0 | 3.5 | 7.5 | 0.0 | 2.0 | 3.5 | 7.5 |
| Hr | Cr(VI), mg/kg | | | | | From Avg | pH Units | | | | Eh, mV | | | |
| 24 | 5,400 | 1,390 | 826 | 589 | 25 | 99.4 | | 11.1 | 10.2 | 9.7 | | 115 | 118 | 144 |
| 168 | 3,840 | 435 | 229 | 293 | 35 | 99.1 | | 11.2 | 10.6 | 10.1 | | 156 | 149 | 168 |
| 720 | 3,260 | 99 | 138 | 36 | 12 | 99.7 | | 11.2 | 10.7 | 10.5 | | 182 | 136 | 128 |
| AVG | 4,060 | | | | | | | | | | | | | |

The table sets forth the ascorbic acid stoichiometric multiples (0, 2.0, 3.5, 5.0, and 7.5) applied to the different aliquots of Sample A and the Cr(VI) concentrations, pH, and $E_h$ results of the control (0 multiple) and ascorbic acid-treated samples at increasing time intervals after initial mixing (0 time). The arithmetic mean (average) of the control samples is presented at the bottom left of the table and is used to calculate the indicated percentages of [Cr(VI)] reduction achieved. It can be seen that for Sample A the 7.5× stoichiometric multiple reduced the Cr(VI) concentration in the soil matrix by about 99% within the first hour, and exhibited greater than 99% [Cr(VI)] reduction after exposure to ambient conditions for 720 hours (30 days). For the 7.5× stoichiometric multiple, the pH of the sample decreased markedly from 12.1 to as low as 8.7 after the ascorbic acid was added. After 24 hours the pH had increased to 9.7, and continued increasing to 10.5 after 720 hours. This behavior is attributed to the highly alkaline condition of the sample. For the 7.5× stoichiometric multiple, the highly oxidized condition of the control (untreated) sample, represented by an $E_h$ of 533 mV, was substantially decreased by the addition of ascorbic acid to an $E_h$ of 195 mV within the first hour after treatment. The $E_h$ continued to gradually decrease to 128 mV over the 720-hour test period. The data indicate that the decrease in $E_h$ coincided with the reduction of Cr(VI) to Cr(III) immediately after the addition and mixing of the ascorbic acid. Further, the steadily decreasing $E_h$ demonstrates that the treated material remained in a reduced state, i.e., in a condition unfavorable for oxidation reactions that might occur in the soil and generate Cr(VI).

Figure 1D:
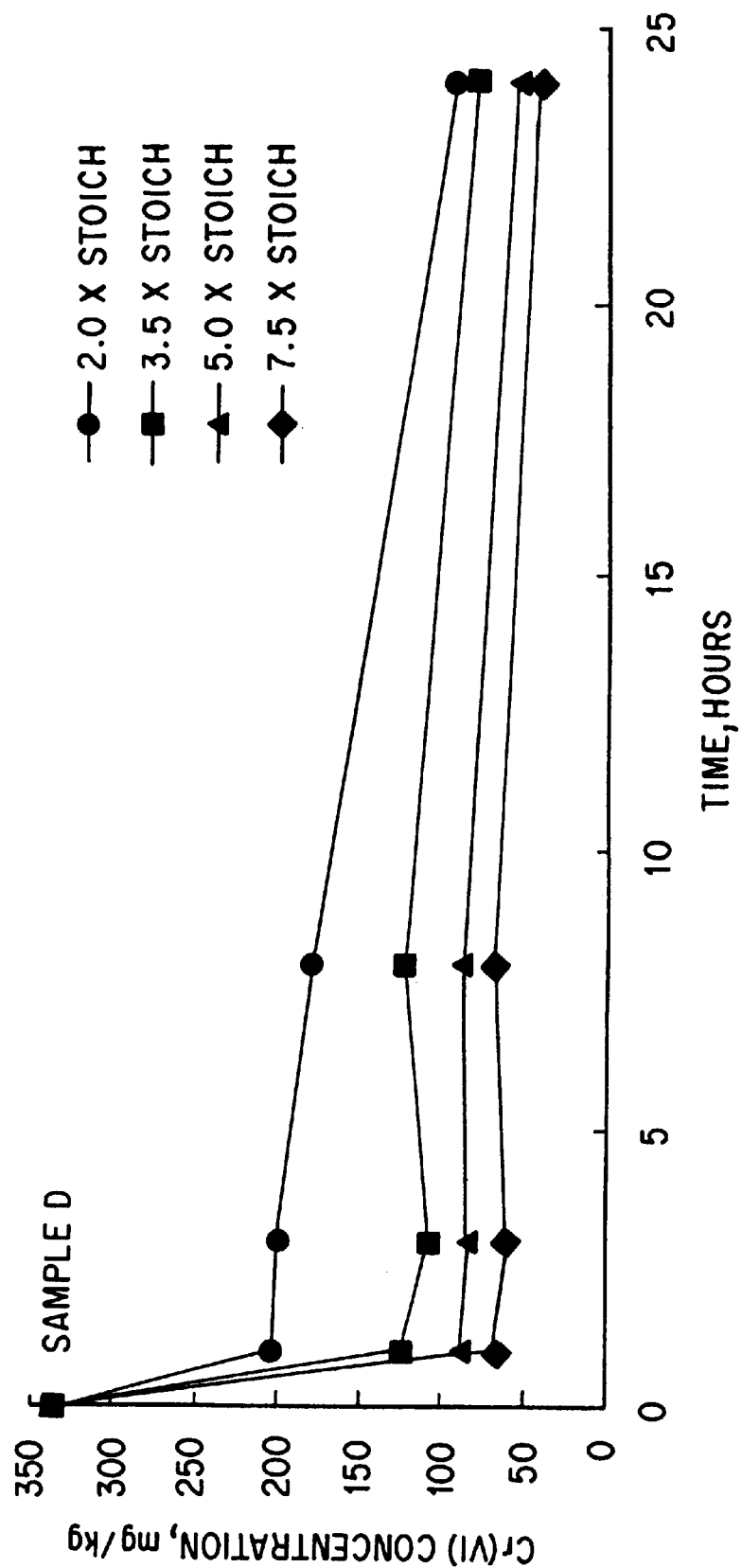
Figure 1E:
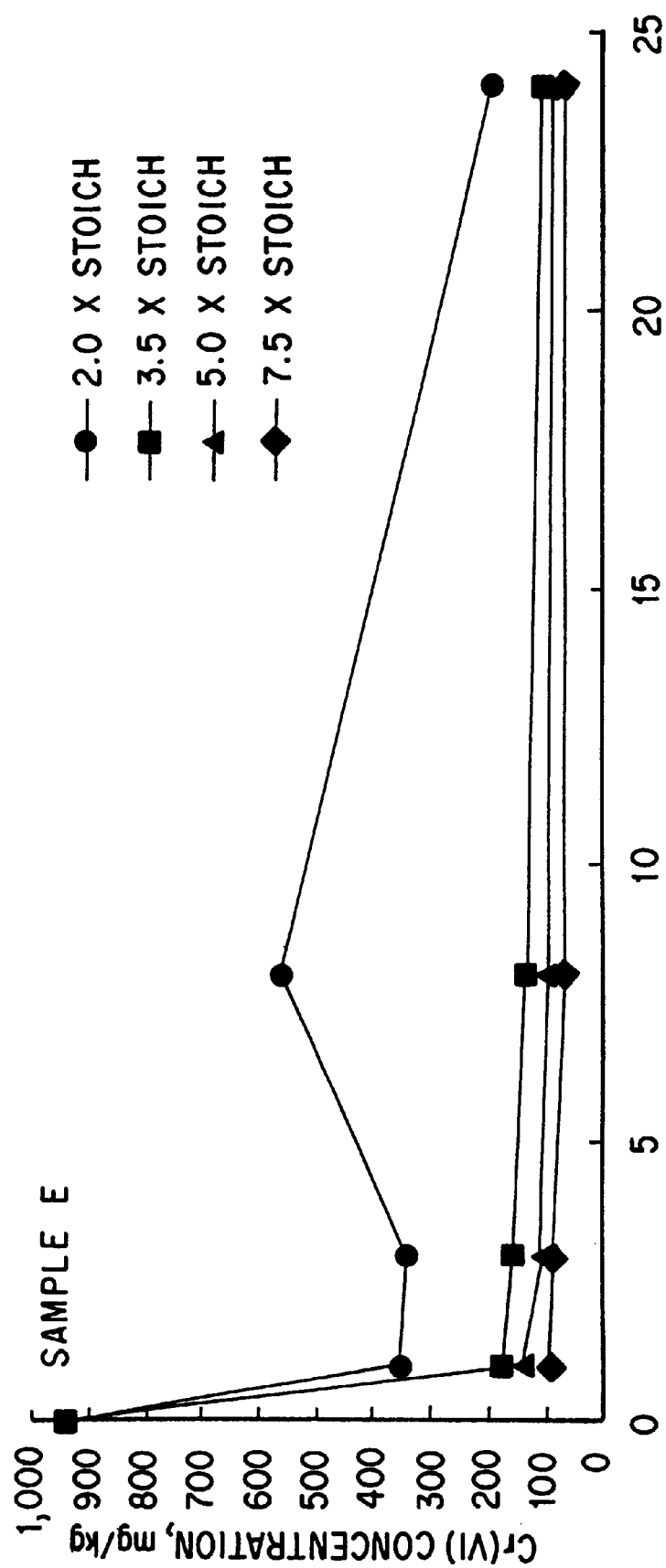

At stoichiometric multiples less than 7.5×, the [Cr(VI)] reduction reaction was not as rapid (see FIGS. 1A–1E for 0 to 24 hours) or as effective as the 7.5× stoichiometric multiple (see Table 1 columns 2.0, 3.5, and 5.0). For illustration, the 2× stoichiometric multiple yielded only about 66%, 89%, and 98% [Cr(VI)] reduction in 24 hours, 168 hours (7 days), and 720 hours (30 days), respectively. However, Cr(VI) concentrations for all stoichiometric multiples measured at 720 hours contained 138 mg Cr(VI)/kg or less, equivalent to a greater than 96.6% reduction.

The results of treating Sample A using acetic acid and citric acid are presented in Table 2.

TABLE 2

Treatment of Cr(VI)-Bearing Soils by Acetic or Citric Acid
Sample A

| | | Stoichiometric Multiple | | | | | | |
|---|---|---|---|---|---|---|---|---|
| Treatment Additive | Time Hr | 0 | 3.5 | 7.5 | % Cr(VI) Reduced | 0 | 7.5 | 0 | 7.5 |
| | | Cr(VI), mg/kg | | | | pH Units | | Eh, mV | |
| | 0 | 4,060 | | | | 12.1 | | 533 | |
| Acetic acid | 4 | | 2,750 | 2,290 | 43.6 | | 9.9 | | 287 |
| Acetic acid | 144 | | 2,370 | | | | | | |
| Citric acid | 4 | | 2,400 | 2,120 | 47.8 | | 7.9 | | 375 |
| Citric acid | 144 | | 2,220 | 1,980 | 51.2 | | 9.7 | | 300 |

These data show that these two organic acids were significantly less effective in reducing [Cr(VI)] than ascorbic acid at similar treatment dosages. Less than 52% reduction was achieved 6 days after and the treated samples continued to exhibit oxidizing conditions (high $E_h$) consistently or citric acid addition.

EXAMPLE 2

The above-described protocol was applied to a COPR-bearing soil (designated "Sample B") an average over the test period of 314 mg Cr(VI)/kg. Table 3 summarizes the results of the testing.

TABLE 3

Ascorbic Acid Treatment of Cr(VI)-Bearing Soils
Sample B

| | Stoichiometric Multiple | | | | | | | | | | | | |
|---|---|---|---|---|---|---|---|---|---|---|---|---|---|
| Time | 0 | 2.0 | 3.5 | 5.0 | 7.5 | % Cr(VI) Reduced | 0.0 | 2.0 | 3.5 | 7.5 | 0.0 | 2.0 | 3.5 | 7.5 |
| Hr | Cr(VI), mg/kg | | | | | From Avg | pH Units | | | | Eh, mV | | | |
| 0 | | | | | | | 10.5 | | | | 409 | | | |
| 1 | 432 | 111 | 58 | 72 | 34 | 89.2 | | 9.0 | 8.1 | 6.7 | | 171 | 179 | 190 |
| 3 | 265 | 108 | 57 | 47 | 22 | 93.0 | | 8.6 | 8.6 | 7.2 | | 139 | 143 | 181 |
| 8 | 276 | 136 | 65 | 75 | 38 | 87.9 | | 8.5 | 8.1 | 7.9 | | 134 | 144 | 146 |
| 28 | 290 | 81 | 40 | 35 | 15 | 95.2 | | 8.3 | 8.2 | 8.0 | | 127 | 156 | 117 |
| 48 | 292 | 80 | 38 | 27 | 16 | 94.9 | | 9.2 | 9.2 | 8.2 | | 140 | 128 | 105 |
| 168 | 284 | 59 | 29 | 14 | 12 | 96.2 | | 9.6 | 9.3 | 8.8 | | 200 | 181 | 180 |
| 336 | 319 | 55 | 2 | 1 | 2 | 99.4 | | 9.5 | 9.7 | 8.1 | | 248 | 263 | 146 |
| 672 | 357 | 50 | 10 | 2 | 2 | 99.4 | | 9.5* | 9.5* | 8.8* | | 388* | 584* | 164* |
| AVG | 314 | | | | | | | | | | | | | |

*Sample had dried and required moisture addition to obtain measurement

The untreated (control) sample exhibited an initial pH of 10.5 and an initial $E_h$ of 409 mV, indicating that it was highly alkaline and in an oxidized condition. Within one hour after treatment, the 7.5× stoichiometric multiple of ascorbic acid reduced the Cr(VI) concentration in Sample B by about 89%, the pH had decreased to 6.7, and the $E_h$ had decreased to 190 mV. The pH gradually increased to slightly less than pH 9 over the 672 hours (4 weeks), while the $E_h$ remained in the range of approximately 110 to 180 mV. The Cr(VI) concentration also continued to decrease to about 2 mg Cr(VI)/kg, representing a [Cr(VI)] reduction of more than 99%.

At lesser stoichiometric multiples, the [Cr(VI)] reduction reaction was not as rapid or effective as at the maximum dosage applied. For illustration, the 2× stoichiometric multiple yielded about 74%, 81%, and 84% [Cr(VI)] reduction in 28 hours, 168 hours, and 672 hours, respectively. All the stoichiometric multiples collected at 672 hours, however, contained 50 mg Cr(VI)/kg or less, representing at least 84% [Cr(VI)] reduction.

The results of treating Sample B using acetic acid and citric acid (Table 4) show that these two organic acids achieved essentially no [Cr(VI)] reduction 144 hours after treatment using similar treatment dosages as for ascorbic acid, and the treated sample continued to exhibit highly oxidizing conditions consistently after acetic or citric acid addition.

TABLE 4

Treatment of Cr(VI)-Bearing Soils by Acetic or Citric Acid
Sample B

| | | Stoichiometric Multiple | | | | | |
|---|---|---|---|---|---|---|---|---|
| Treatment Additive | Time Hr | 0 | 3.5 | 7.5 | % Cr(VI) Reduced | 0 | 7.5 | 0 | 7.5 |
| | | Cr(VI), mg/kg | | | | pH Units | | Eh, mV | |
| | 0 | 314 | | | | 10.5 | | 409 | |
| Acetic acid | 4 | | 360 | 435 | −38.4 | | 8.3 | | 433 |
| Acetic acid | 144 | | 350 | 350 | −11.3 | | 9.6 | | 362 |
| Citric acid | 4 | | 440 | 470 | −49.5 | | 8.2 | | 425 |
| Citric acid | 144 | | 250 | 300 | 4.6 | | 9.6 | | 371 |

The negative values (increased concentrations) in the table probably reflect variations associated with sampling non-homogeneous materials.

EXAMPLE 3

The above-described protocol was applied to a COPR-bearing soil (designated "Sample C") containing an average over the test period of 3,980 mg Cr(VI)/kg. The untreated (control) sample exhibited an initial pH of 11.8 and an initial $E_h$ of 516 mV, indicating that it was highly alkaline and in an oxidized condition. Table 5 summarizes the results of the testing.

confirming that the sample continued to exhibit a reducing environment more than a month after treatment.

At lesser stoichiometric multiples, the [Cr(VI)] reduction was not as rapid or effective as at the maximum dosage applied. For illustration, the 2× stoichiometric multiple yielded about 60%, 80%, and 82% [Cr(VI)] reduction in 24 hours, 432 hours, and 816 hours, respectively.

The results of treating Sample C using acetic acid and citric acid, as shown in Table 6, demonstrate that these two

TABLE 5

Ascorbic Acid Treatment of Cr(VI)-Bearing Soils
Sample C

| | | | | | | | | | | | | | | | |
|---|---|---|---|---|---|---|---|---|---|---|---|---|---|---|---|
| | | | Stoichiometric Multiple | | | | | | | | | | | | |
| Time | 0 | 2.0 | 3.5 | 5.0 | 7.5 | % Cr(VI) Reduced | 0.0 | 2.0 | 3.5 | 7.5 | 0.0 | 2.0 | 3.5 | 7.5 |
| Hr | | Cr(VI), mg/kg | | | | From Avg | | pH Units | | | | Eh, mV | | |
| 0 | | | | | | | 11.8 | | | | 516 | | | |
| 1 | 4,640 | 1,490 | 1,400 | 952 | 1 | 99.97 | | 8.6 | 8.3 | 7.1 | | 179 | 179 | 175 |
| 3 | 5,340 | 1,680 | 1,220 | 466 | 1 | 99.97 | | 8.9 | 8.3 | 7.3 | | 173 | 155 | 134 |
| 8 | 4,320 | 1,880 | 1,990 | 1,200 | 56 | 98.6 | | 9.2 | 8.6 | 7.6 | | 140 | 138 | 93 |
| 24 | 4,330 | 1,600 | 455 | 487 | 43 | 98.9 | | 9.8 | 8.8 | 7.8 | | 139 | 100 | 83 |
| 144 | 4,810 | | 518 | | 6 | 99.8 | | | | | | | | |
| 432 | 2,200 | 803 | 453 | 481 | 25 | 99.4 | | 10.9 | 10.3 | 8.5 | | 164 | 142 | 51 |
| 816 | 2,250 | 687 | 726 | 192 | 54 | 98.6 | | 11.7 | 10.6 | 9.2 | | 179 | 174 | 80 |
| AVG | 3,980 | | | | | | | | | | | | | |

Within one hour of ascorbic acid addition and mixing, the 7.5× stoichiometric multiple showed a [Cr(VI)] reduction of greater than 99.9%. The pH had decreased to near neutral at 7.1, and the $E_h$ had decreased to 175 mV. Over the course of 816 hours (34 days), the treated sample exhibited an increase of more than two pH units, which was attributable to the highly alkaline condition of the initial sample. During the same period, the Cr(VI) concentration was measured within the range of 1 to 56 mg/kg, representing greater than 98% [Cr(VI)] reduction. These data, coupled with the pH increase, suggest that a gradual Cr(VI) leaching may have continued from the inner pores of the soil matrix. However, the $E_h$ continued to decrease to 80 mV at 816 hours, organic acids were significantly less effective in reducing [Cr(VI)] than ascorbic acid at similar treatment dosages.

TABLE 6

Treatment of Cr(VI)-Bearing Soils by Acetic or Citric Acid
Sample C

| | | | | | | | | | |
|---|---|---|---|---|---|---|---|---|---|
| | | Stoichiometric Multiple | | | | | | | |
| Treatment | Time | 0 | 3.5 | 7.5 | % Cr(VI) | 0 | 7.5 | 0 | 7.5 |
| Additive | Hr | Cr(VI), mg/kg | | | Reduced | pH Units | | Eh, mV | |
| | 0 | 3,980 | | | | 11.8 | | 516 | |
| Acetic acid | 4 | | 2,620 | 2,640 | 33.7 | | 7.7 | | 376 |
| Acetic acid | 144 | | 2,300 | 2,410 | 39.4 | | 9.3 | | 322 |
| Citric acid | 4 | | 1,860 | 1,780 | 55.3 | | 7.4 | | 428 |
| Citric acid | 144 | | 2,180 | 2,120 | 46.7 | | 8.6 | | 362 |

Reduction in the range of only 33 to 55% [Cr(VI)] was achieved 144 hours after treatment at the 7.5× stoichiometric multiple, and the samples treated with acetic or citric acid continued to exhibit oxidizing conditions (high $E_h$) consistently after treatment.

EXAMPLE 4

The above-described protocol was applied to a COPR-bearing soil (designated "Sample D") containing an average over the test period of 336 mg Cr(VI)/kg. The untreated (control) sample exhibited an initial pH of 9.8 and an initial $E_h$ of 573 mV, indicating that it was highly alkaline and in an oxidized condition. Table 7 summarizes the results of the testing.

TABLE 7

Ascorbic Acid Treatment of Cr(VI)-Bearing Soils
Sample D

| | | | | | | | | | | | | | | |
|---|---|---|---|---|---|---|---|---|---|---|---|---|---|---|
| | \multicolumn{14}{c|}{Stoichiometric Multiple} |
| Time | 0 | 2.0 | 3.5 | 5.0 | 7.5 | % Cr(VI) Reduced | 0.0 | 2.0 | 3.5 | 7.5 | 0.0 | 2.0 | 3.5 | 7.5 |
| Hr | \multicolumn{5}{c|}{Cr(VI), mg/kg} | From Avg | \multicolumn{4}{c|}{pH Units} | \multicolumn{4}{c|}{Eh, mV} |
| 0 | | | | | | | | 9.8 | | | | 573 | | |
| 1 | 386 | 204 | 124 | 88 | 66 | 80.3 | | 8.8 | 8.5 | 7.8 | | 226 | 225 | 240 |
| 3 | 377 | 200 | 107 | 84 | 61 | 81.8 | | 9.1 | 8.8 | 8.1 | | 220 | 215 | 217 |
| 8 | 323 | 181 | 123 | 88 | 69 | 79.4 | | 9.2 | 8.7 | 8.3 | | 216 | 218 | 204 |
| 24 | 318 | 92 | 79 | 55 | 42 | 87.5 | | 9.3 | 9.0 | 8.5 | | 220 | 215 | 196 |
| 51 | 286 | 85 | 84 | 56 | 39 | 88.4 | | 9.3 | 9.0 | 8.4 | | 227 | 210 | 191 |
| 192 | 302 | 95 | 79 | 64 | 42 | 87.5 | | 9.3 | 9.2 | 8.5 | | 309 | 294 | 261 |
| 408 | 323 | 80 | 70 | 64 | 42 | 87.5 | | 9.0 | 8.8 | 8.0 | | 343 | 154 | 165 |
| 1,032 | 369 | 126 | 66 | 61 | 56 | 83.3 | | 8.2* | 8.3* | 8.4* | | 653* | 687* | 644* |
| AVG | 336 | | | | | | | | | | | | | |

*Sample had dried and required moisture addition to obtain measurement.

Within one hour of ascorbic acid addition and mixing, the 7.5× stoichiometric multiple showed a [Cr(VI)] reduction of about 80%. The pH had decreased to 7.8 and the $E_h$ had decreased to 240 mV. Over the course of 1,032 hours (43 days), the sample treated with the greatest dosage of ascorbic acid exhibited a gradual increase in pH to about 8.5. During the same period, the Cr(VI) concentration was consistently in the range of 39 to 69 mg/kg, representing between 79 and 88% [Cr(VI)] reduction. The $E_h$ remained in the range of approximately 160 to 260 mV for 408 hours (17 days).

At lesser stoichiometric multiples, the [Cr(VI)] reduction reaction was not as rapid or effective as the maximum dosage applied. For illustration, the 2× stoichiometric multiple yielded about 73%, 72%, and 62% [Cr(VI)] reduction in 24 hours, 192 hours (8 days), and 1,032 hours, respectively.

The results of treating Sample D using acetic acid and citric acid, as shown in Table 8, demonstrate that these two organic acids achieved essentially no [Cr(VI)] reduction 144 hours after treatment at similar treatment dosages to ascorbic acid treatment.

TABLE 8

Treatment of Cr(VI)-Bearing Soils by Acetic or Citric Acid
Sample D

| | | \multicolumn{3}{c|}{Stoichiometric Multiple} | | | | | |
|---|---|---|---|---|---|---|---|---|---|
| Treatment Additive | Time Hr | 0 | 3.5 | 7.5 | % Cr(VI) Reduced | 0 | 7.5 | 0 | 7.5 |
| | | \multicolumn{3}{c|}{Cr(VI), mg/kg} | | \multicolumn{2}{c|}{pH Units} | \multicolumn{2}{c|}{Eh, mV} |
| | 0 | 336 | | | | 9.8 | | 12.1 | |
| Acetic acid | 4 | | 315 | 330 | 1.6 | | 7.9 | | 452 |
| Acetic acid | 144 | | 360 | 390 | −16.2 | | 8.8 | | 419 |
| Citric acid | 4 | | 530 | 380 | −13.3 | | 8.0 | | 386 |
| Citric acid | 144 | | 270 | 280 | 16.5 | | 8.9 | | 387 |

The negative values (increased concentrations) in the Table 8 probably reflect variations associated with sampling non-homogeneous materials. The $E_h$ values of the samples treated with acetic or citric acid were substantially higher than the samples treated with ascorbic acid and remained in a substantially oxidizing range.

EXAMPLE 5

The above-described protocol was applied to a COPR-bearing soil (designated "Sample E") containing an average over the test period of 940 mg Cr(VI)/kg. The untreated (control) sample exhibited an initial pH of 10.6 and an initial $E_h$ of 340 mV. Table 9 summarizes the results of the testing.

range of approximately 110–190 mV for the 672-hour period.

At lesser stoichiometric multiples, the [Cr(VI)] reduction reaction was not as rapid or effective as the maximum dosage applied. For illustration, the 2× stoichiometric multiple yielded about 80%, 87%, and 92% [Cr(VI)] reduction in 24 hours, 168 hours, and 672 hours, respectively. However, all the treated samples contained less than $\leq 78$ mg Cr(VI)/kg (91% reduction) 672 hours after ascorbic acid treatment.

TABLE 9

Ascorbic Acid Treatment of Cr(VI)-Bearing Soils
Sample E

| | | | | | | | | | | | | | | |
|---|---|---|---|---|---|---|---|---|---|---|---|---|---|---|
| | Stoichiometric Multiple | | | | | | | | | | | | | |
| Time | 0 | 2.0 | 3.5 | 5.0 | 7.5 | % Cr(VI) Reduced | 0.0 | 2.0 | 3.5 | 7.5 | 0.0 | 2.0 | 3.5 | 7.5 |
| Hr | Cr(VI), mg/kg | | | | | From Avg | pH Units | | | | Eh, mV | | | |
| 0 | | | | | | | 10.6 | | | | 340 | | | |
| 1 | 1,020 | 349 | 173 | 138 | 88 | 90.6 | | 9.5 | 8.7 | 8.3 | | 133 | 111 | 112 |
| 3 | 875 | 336 | 155 | 104 | 85 | 91.0 | | 9.2 | 8.8 | 8.6 | | 140 | 123 | 113 |
| 8 | 871 | 557 | 131 | 92 | 63 | 93.3 | | 10.2 | 9.3 | 8.6 | | 136 | 144 | 111 |
| 24 | 869 | 189 | 101 | 80 | 65 | 93.1 | | 11.6 | 11.0 | 10.1 | | 153 | 123 | 121 |
| 168 | 738 | 119 | 78 | 57 | 40 | 95.7 | | 11.5 | 11.1 | 10.2 | | 199 | 156 | 147 |
| 336 | 1,070 | 125 | 89 | 80 | 51 | 94.6 | | 11.3 | 11.0 | 10.1 | | | | |
| 672 | 1,140 | 78 | 63 | 65 | 53 | 94.4 | | 11.2* | 10.7* | 10.1* | | 352* | 242* | 191* |
| AVG | 940 | | | | | | | | | | | | | |

*Sample had dried and required moisture addition to obtain measurement

Within one hour of ascorbic acid addition and mixing, the 7.5× stoichiometric multiple showed a [Cr(VI)] reduction of greater than 90%. The pH had decreased to 8.3 and the $E_h$ had decreased to 112 mV. Over the course of 672 hours (28 days), the treated sample exhibited an increase of almost two pH units, attributed to the highly alkaline condition of the initial sample. During the same period, the Cr(VI) concentration was measured at 40 to 88 mg/kg representing up to 95% [Cr(VI)] reduction. The $E_h$ remained in the reducing The results of treating Sample E using acetic acid and citric acid (Table 10) show that these two organic acids were significantly less effective in reducing [Cr(VI)] than ascorbic acid at similar treatment dosages.

TABLE 10

Treatment of Cr(VI)-Bearing Soils by Acetic or Citric Acid
Sample E

| | | Stoichiometric Multiple | | | | | | |
|---|---|---|---|---|---|---|---|---|
| Treatment Additive | Time Hr | 0 | 3.5 | 7.5 | % Cr(VI) Reduced | 0 | 7.5 | 0 | 7.5 |
| | | Cr(VI), mg/kg | | | | pH Units | | Eh, mV | |
| | 0 | 940 | | | | 10.6 | | 340 | |
| Acetic acid | 4 | | 930 | 900 | 4.3 | | 10.6 | | 258 |
| Acetic acid | 144 | | 880 | 850 | 9.6 | | 10.9 | | 277 |
| Citric acid | 4 | | 870 | 840 | 10.7 | | 9.6 | | 295 |
| Citric acid | 144 | | 765 | 685 | 27.2 | | 10.5 | | 249 |

Reduction in the range of approximately 9 to 27% [Cr(VI)] was achieved 144 hours after treatment, and the treated samples continued to exhibited significantly greater $E_h$ values compared to those for the samples treated with ascorbic acid.

Summary of Exemplary Data

FIGS. 1A through 1E show the test data from the tables above plotted for each of the five Cr(VI)-bearing samples (A–E). Only the first 24 hours of the data are shown since the greatest percentage reduction occurred within this period. Clearly, greater amounts of ascorbic acid added to the sample (higher stoichiometric multiples/dosages) result in lower Cr(VI) concentrations in the treated sample. However, the actual differences in resultant concentrations of Cr(VI) for the different dosages depend on the nature/composition of the sample. Thus, a range of concentration reduction is seen from more than 80% [Cr(VI)] reduction for Sample D to greater than 99.9% [Cr(VI)] reduction for Sample C at the highest ascorbic acid dosage applied (7.5× stoichiometric multiple). FIGS. 1A–1E and Tables 1, 3, 5, 7, and 9 also show that, over longer periods of time, percentage reductions similar to those obtained with the 7.5× multiple (>90%) were achieved at smaller treatment dosages for all but Sample D (83%).

Additionally, FIGS. 1A–1E show that the first-hour rate of [Cr(VI)] reduction was not only rapid and substantially similar for each of the different samples, but also was dosage independent, as indicated by the similar initial slopes of the first-hour curves for the different stoichiometric multiples. For all samples, most of the [Cr(VI)] reduction (e.g. 65–85% and 90–99.9% at stoichiometric multiples of 3.5 and 7.5, respectively) and $E_h$ decrease (more than 200 mV) occurred essentially immediately (within the first hour) after ascorbic acid addition and mixing.

Tables 1, 3, 5, 7, and 9 also show that the pH initially decreased sharply after mixing with larger decreases in magnitude for the larger dosages of ascorbic acid than for the smaller dosages. The pH then steadily increased over days and weeks. The final pH was generally less than or equal to the initial pH although, here again, some dependence on stoichiometric multiple can be seen. The gradual increase in pH after the abrupt initial decrease immediately after ascorbic acid treatment is likely due to the leaching of indigenous alkalinity from the internal pores of the source materials at a diminishing rate. During the same time period, the $E_h$ typically remained in the range to which it had decreased simultaneously with the initial [Cr(VI)] reduction. These data indicate that sufficient ascorbic acid had been incorporated into the material matrix of the samples so that reducing conditions continued to persist long after treatment.

To practice the process of this invention to reduce the Cr(VI) concentration in complex soils/materials to acceptable levels, the ascorbic acid must be adequately mixed with the soils/materials to provide contact of the dissolved ascorbic acid with the Cr(VI) found: 1) on the surface of soils/materials; 2) within a short distance into the soils/materials; 3) within the interstices and pores of the Cr(VI)-bearing soils/materials and 4) in the associated aqueous environment. However, as can be seen from the examples above, no special fracturing, sifting, grating, or other mechanical procedure is required. The liquid medium (water) in which the ascorbic acid is dissolved or suspended adequately carries the ascorbic acid into the materials. Indeed, so effective is this transport that the actual reduction of most of the Cr(VI) is achieved within one hour of mixing. Since the physical composition (e.g. density/compactness) of soils/materials contaminated with Cr(VI) varies over a wide range, no single mixing protocol will work in all situations. However, mixing methods are well known to those experienced in the environmental remediation art, and appropriate mixing protocols for various soils/materials compositions may be determined without undue experimentation for a given soils/materials.

One of the dramatic benefits of the process of this invention, is that no constraints are placed on the mixing methods by the process itself, unlike other processes in the art. So effective is the reduction of Cr(VI) by ascorbic acid, that the process of this invention may be used in situ for the treatment of contaminated soils/materials without the necessity of removing the soils/materials from their place of repose. Based on test results and knowledge of soil chemistry, it is expected that the resultant Cr(III) formed by reduction of Cr(VI) will be thermodynamically stable in typical environmental soils settings and not be oxidized back to Cr(VI) over time under most environmental conditions where Cr(VI)-bearing soils/materials require remediation.

Since the ascorbic acid is soluble in water, the process can be applied in situ to soils/materials that are: 1) unsaturated and located above the water table; 2) constantly saturated below the top of the water table; or 3) both unsaturated and saturated in the soil column at the same time. In the case of saturated soils, sufficient ascorbic acid must be added to reduce the [Cr(VI)] in both the soils and the associated ground water. The process of this invention also eliminates the need to excavate the soils for ex situ treatment, which would necessitate replacement of the treated soils into the ground or repository from which they came or disposition at another location. However, ex situ treatment also is possible with the method of this invention by mixing soils/materials with ascorbic acid following excavation and returning the treated materials to the landscape from which they were removed.

The present invention is also based upon recognition that, unlike methods taught in the prior art, chemical reduction of Cr(VI)-bearing soils can be achieved without the need to: 1) leach or extract the Cr(VI) from the soils/materials and treat the Cr(VI) contained in the leachate; 2) modify the pH of the Cr(VI)-bearing soils or associated pore water by treatment with acids or bases to provide suitable conditions for reducing agents to react or to provide suitable conditions for the propagation of bacteria; or 3) admix bacteria or bacteria-containing material, nutrients, or supplemental organic material into the soils.

One of the important observations of this invention is that minimal gas was generated when ascorbic acid was added to the alkaline Cr(VI)-bearing soils discussed above. However, when a mineral acid was added to samples of the same materials, substantial amounts of gas were generated and marked increases in soil temperature were observed. This gas was most likely liberated by decreasing the pH of the soils sufficiently to favor carbon dioxide gas liberation over bicarbonate dissolution. If the mineral acid processes of the prior art were to be applied to such highly alkaline Cr(VI)-bearing soils/materials under field conditions, the generation of significant amounts of gas will most likely limit the amount of reducing agent which can be admixed in situ with the soils/materials, and consequently limit the degree of Cr(VI) reduction achieved. Should the gas eventually dissipate, then it would be necessary to repeat the treatment at a subsequent time. The problem of excess gas is minimized using ascorbic acid, thereby significantly decreasing the effort and time required for treatment compared to using mineral acid processes for reducing Cr(VI) to Cr(III) in highly alkaline Cr(VI)-bearing soils/materials.

Comparison of the ascorbic acid results with the acetic and citric acid results (Tables 2, 4, 6, 8, and 10) for each of the five samples tested clearly demonstrates that the reduction of [Cr(VI)] was much more effective using ascorbic acid than comparable treatment dosages of acetic acid or citric acid. Similarly, the collective treatment results show that ascorbic acid is both more effective (greater percentage reduction) and reacts much more rapidly to reduce [Cr(VI)] than all the organic compounds studied by Deng and Stone.

As shown by the data in FIGS. 1A–1E, for different source soils/materials, the same dosage multiples resulted in different [Cr(VI)] reductions, although in all cases the percentage reduction was very significant. Clearly differences in soil compositions, as described earlier, slightly affect their response to treatment. These data indicate the importance of conducting preliminary tests, as taught by this invention, on site-representative soils/materials samples in order to determine the appropriate dosage required to reach a desired degree of [Cr(VI)] reduction and reaction rate for each source soil.

REFERENCES CITED

1. Sax, N. I and Lewis, R. J., Sr. eds. 1993. Hawley's Condensed Chemical Dictionary, 13th edn., Van Nostrand Reinhold, New York, p. 101.
2. Austin, G. T. 1984. Shreve's Chemical Process Industries. 5th ed. McGraw-Hill, New York.
3. Westbrook, J. H. 1991. Chromium and Chromium Alloys. In: Kirk-Othmer Encyclopedia of Chemical Technology, 4th edn., Vol. 6, Kroschwitz, J. I. and Howe-Grant, M., eds., Wiley-Interscience, New York.
4. The Hazardous Waste Consultant, 1993. *EPA Updates CERCLA Priority List of Hazardous Substances,* 11 (3), 2.26–2.30. McCoy and Associates, Inc., Lakewood, Colo.
5. USEPA, 1995a. IRIS (Integrated Risk Information System). A continuously updated electronic database maintained by U.S. Environmental Protection Agency. Bethesda, Md.
6. Bartlett. R. J. and James. B. R., 1988. Mobility and Bioavailability of Chromium in Soils. In: Chromium in Natural and Human Environments. Nriagu, J. O. and Nieboer, E., eds.; Wiley-Interscience: New York, 267–304.
7. Nriagu, J. O. and Nieboer, E., Eds. 1988. Chromium in the Natural and Human Environments. Wiley-Interscience, New York.
8. Page, B. J. and Loar, G. W., 1991. Chromium Compounds. In: Kirk-Othmer Encyclopedia of Chemical Technology, 4th edn., Vol. 6, Kroschwitz, J. I. and Howe-Grant, M., eds., Wiley-Interscience, New York.
9. James, B. R., 1994. Hexavalent Chromium Solubility and Reduction in Alkaline Soils Enriched with Chromite Ore Processing Residue; *J. Environ. Qual.* 23, 227–233.
10. James, B. R., 1996. The Challenge of Remediating Chromium-Contaminated Soil. *Environ Sci. Technol.* 30 (6), 248A–251 A.
11. Copson, R. L., 1956. Production of Chromium Chemicals. In: Chromium. I. Chemistry of Chromium and Its Compounds, Udy, M. J., ed., Reinhold Publishing Corp., New York.
12. Vitale, R. J., Mussoline, G. R., Petura, J. C., James, B. R. 1994. Hexavalent Chromium Extraction from Soils: Evaluation of an Alkaline Digestion Method, *J. Environ. Qual.,* 23, 1249–1256.
13. Environmental Science and Engineering (ES&E), 1989. *Remedial Investigation for Chromium Sites in Hudson County, N.J.* Prepared for the New Jersey Department of Environmental Protection. Environmental Science and Engineering, Inc.
14. Dragun, J. and A. Chiasson, 1991. Elements in North American Soils. Hazardous Materials Control Resources Institute, Greenbelt, Md.
15. James, B. R., Petura, J. C., Vitale, R. J. and Mussoline, G. R. 1995. Hexavalent Chromium Extraction from Soils: A Comparison of Five Methods, *Environ. Sci. Technol.,* 29:2377–2381.
16. The Hazardous Waste Consultant, 1996. *Remediating Soils and Sediments Contaminated with Heavy Metals,* 14 (6), 4.1–4.57 Elsevier Science, Inc., New York.
17. USEPA 1996. Soil Screening Guidance. Technical Background Document, EPA/540/R-95/128, PB96–963502. U.S. EPA Office of Solid Waste and Emergency Response, Washington, D.C.
18. Deng, B. and Stone, A. 1996. Surface-Catalyzed Chromium (VI) Reduction: Reactivity Comparisons of Different Organic Reductants and Different Oxide Surfaces, *Environ. Sci. Technol.* 30 (8), 2484–2494.
19. USEPA, 1995 Test methods for evaluating solid wastes, physicalchemical methods, SW-846, 3rd update. 3rd ed. *Method 3060A—Alkaline Digestion for Hexavalent Chromium,* Washington, D.C.: U.S. EPA Office of Solid Waste and Emergency Response.
20. USEPA, 1994. Test methods for evaluating solid wastes, physicalchemical methods, SW-846, 2nd update. 3rd ed. *Method 7196A—Hexavalent Chromium (Colorimetric),* U.S. EPA Office of Solid Waste and Emergency Response, Washington, D.C.

What is claimed is:

1. A method for lowering the concentration of hexavalent chromium in COPR contaminated soils, sediments and fills to a desired level comprising treating the COPR contaminated soils, sediments, and fills with a sufficient amount of ascorbic acid to chemically reduce the hexavalent chromium to a lower valence state.

2. A method for lowering the concentration of hexavalent chromium in COPR contaminated soils, sediments, and fills to a desired level comprising the following steps:
   a. determining the amount of ascorbic acid necessary to chemically reduce sufficient hexavalent chromium in the COPR contaminated soils, sediments, and fills to a lower valence state; and
   b. mixing the determined amount of ascorbic acid with the COPR contaminated soils, sediments, and fills.

3. The method of claim 2 in which the determination of the amount of ascorbic acid necessary to chemically reduce sufficient hexavalent chromium in COPR contaminated soils, sediments, and fills to a lower valence state further comprises the following steps:
   a. obtaining representative samples of the COPR contaminated soils, sediments, and fills;
   b. mixing the samples with varying dosages of ascorbic acid;
   c. measuring the concentration of hexavalent chromium remaining in the samples as a function of time after mixing; and
   d. selecting the ascorbic acid dosage which reduces the concentration of hexavalent chromium to the desired level.

4. The method of claim 3 in which the determined amount of ascorbic acid is mixed with the COPR contaminated soils, sediments, and fills in situ.

5. The method of claim 4 in which the in situ mixing is performed by a rotary hollow shaft auger-like device which permits injection of ascorbic acid while mixing.

6. The method of claim 2 in which the determined amount of ascorbic acid is mixed with the COPR contaminated soils, sediments, and fills ex situ.

7. The method of claim 2 in which the determination of the amount of ascorbic acid necessary to chemically reduce sufficient hexavalent chromium in COPR contaminated soils, sediments, and fills to a lower valence state further comprises the following steps:
   a. obtaining representative samples of the COPR contaminated soils, sediments, and fills;
   b. mixing the samples with varying dosages of ascorbic acid;
   c. measuring the concentration of hexavalent chromium remaining in the samples as a function of time after mixing;
   d. measuring the redox potential of the samples as a function of time after mixing; and
   e. selecting the ascorbic acid dosage which reduces the concentration of hexavalent chromium to the desired level and maintains a lowered redox potential which corresponds with the desired reduction in hexavalent chromium.

8. The method of claim 7 in which the determined amount of ascorbic acid is mixed with the COPR contaminated soils, sediments, and fills in situ.

9. The method of claim 8 in which the in situ mixing is performed by a rotary hollow shaft auger-like device which permits injection of ascorbic acid while mixing.

10. The method of claim 7 in which the determined amount of ascorbic acid is mixed with the COPR contaminated soils, sediments, and fills ex situ.

11. A method for rapidly lowering the concentration of hexavalent chromium in COPR contaminated soils, sediments, and fills to a desired level comprising treating the soils, sediments, and fills with a sufficient amount of ascorbic acid to chemically reduce the hexavalent chromium to a lower valence state within a few hours.

12. A method for lowering the concentration of hexavalent chromium in COPR contaminated industrial wastes and materials deposited in the environment to a desired level comprising treating the COPR contaminated industrial wastes and materials deposited in the environment with a sufficient amount of ascorbic acid to chemically reduce the hexavalent chromium to a lower valence state.

13. A method for lowering the concentration of hexavalent chromium in COPR contaminated industrial wastes and materials deposited in the environment to a desired level comprising the following steps:
   a. determining the amount of ascorbic acid necessary to chemically reduce sufficient hexavalent chromium in the COPR contaminated industrial wastes and materials deposited in the environment to a lower valence state; and
   b. mixing the determined amount of ascorbic acid with the COPR contaminated industrial wastes and materials deposited in the environment.

14. The method of claim 13 in which the determination of the amount of ascorbic acid necessary to chemically reduce sufficient hexavalent chromium in COPR contaminated industrial wastes and materials deposited in the environment to a lower valence state further comprises the following steps:
   a. obtaining representative samples of the COPR contaminated industrial wastes and materials deposited in the environment;
   b. mixing the samples with varying dosages of ascorbic acid;
   c. measuring the concentration of hexavalent chromium remaining in the samples as a function of time after mixing; and
   d. selecting the ascorbic acid dosage which reduces the concentration of hexavalent chromium to the desired level.

15. The method of claim 14 in which the determined amount of ascorbic acid is mixed with the COPR contaminated industrial wastes and materials deposited in the environment in situ.

16. The method of claim 15 in which the in situ mixing is performed by a rotary hollow shaft auger-like device which permits injection of ascorbic acid while mixing.

17. The method of claim 13 in which the determined amount of ascorbic acid is mixed with the COPR contaminated industrial wastes and materials deposited in the environment ex situ.

18. The method of claim 13 in which the determination of the amount of ascorbic acid necessary to chemically reduce sufficient hexavalent chromium in COPR contaminated industrial wastes and materials deposited in the environment to a lower valence state further comprises the following steps:
   a. obtaining representative samples of COPR the contaminated industrial wastes and materials deposited in the environment;
   b. mixing the samples with varying dosages of ascorbic acid;
   c. measuring the concentration of hexavalent chromium remaining in the samples as a function of time after mixing;
   d. measuring the redox potential of the samples as a function of time after mixing; and
   e. selecting the ascorbic acid dosage which reduces the concentration of hexavalent chromium to the desired level and maintains a lowered redox potential which corresponds with the desired reduction in hexavalent chromium.

19. The method of claim 18 in which the determined amount of ascorbic acid is mixed with the COPR contaminated industrial wastes and materials deposited in the environment in situ.

20. The method of claim 19 in which the in situ mixing is performed by a rotary hollow shaft auger-like device which permits injection of ascorbic acid while mixing.

21. The method of claim 18 in which the determined amount of ascorbic acid is mixed with the COPR contaminated industrial wastes and materials deposited in the environment ex situ.

22. A method for rapidly lowering the concentration of hexavalent chromium in COPR contaminated industrial wastes and materials deposited in the environment to a desired level comprising treating the COPR contaminated industrial wastes and materials deposited in the environment with a sufficient amount of ascorbic acid to chemically reduce the hexavalent chromium to a lower valence state within a few hours.

\* \* \* \* \*